(12) United States Patent
McConnel et al.

(10) Patent No.: US 7,012,536 B2
(45) Date of Patent: Mar. 14, 2006

(54) RETAIN OVERFILL MONITOR WITH INTEGRATED OVER-VACUUM AND OVER-PRESSURE DETECTION

(75) Inventors: Lee A. McConnel, deceased, late of Parkville, MO (US); Colleen L. McConnel, legal representative, Parkville, MO (US); Jeffrey K. Hunter, Blue Springs, MO (US); Larry Ace Gibson, Raytown, MO (US)

(73) Assignee: Delaware Capital Formation, Inc., Wilmington, DE (US)

( * ) Notice: Subject to any disclaimer, the term of this patent is extended or adjusted under 35 U.S.C. 154(b) by 138 days.

(21) Appl. No.: 10/697,573

(22) Filed: Oct. 30, 2003

(65) Prior Publication Data

US 2004/0085200 A1    May 6, 2004

Related U.S. Application Data

(60) Provisional application No. 60/423,020, filed on Nov. 1, 2002.

(51) Int. Cl.
*G08B 21/00* (2006.01)

(52) U.S. Cl. .................... 340/618; 73/291; 137/551; 141/95; 340/450.2; 340/451; 340/626; 700/282

(58) Field of Classification Search ................ 340/612, 340/614, 616, 618, 619, 626, 451, 450.2; 73/291; 141/94, 95, 198; 700/281, 282; 137/255, 256, 551, 557, 558
See application file for complete search history.

(56) References Cited

U.S. PATENT DOCUMENTS

| | | | |
|---|---|---|---|
| 4,112,760 A | 9/1978 | Ishiwata | |
| 4,373,388 A | 2/1983 | Kitamura et al. | |
| 4,491,016 A | 1/1985 | Haefner | |
| 4,805,672 A * | 2/1989 | Berrettini et al. | ............. 141/95 |
| 5,060,512 A | 10/1991 | Kanashige et al. | |

(Continued)

FOREIGN PATENT DOCUMENTS

EP     059530 A1     8/1982

*Primary Examiner*—Thomas Mullen
(74) *Attorney, Agent, or Firm*—Chase Law Firm, L.C.

(57) ABSTRACT

A system for monitoring the conditions within the fuel storage compartments of a transport tank comprises an overfill pressure vacuum probe installed in each fuel storage compartment and which has a first sensor for detecting the presence of fuel at a predetermined level in the compartment, and a second sensor for detecting the pressure of a gaseous head above the fuel. A signal generator responsive to said first and second sensors produces a first signal representing a normal condition when the first sensor is not detecting fuel in the compartment at the predetermined level, a second signal when the second sensor detects a predetermined predetermined high pressure of the gaseous head, and a third signal when the second sensor detects a predetermined low pressure of the gaseous head. An output control responsive to the signals delivers as output the first signal when the second and third signals are not present, and delivers as output the second signal when the second signal is received or delivers the third signal when the third signal is received. A retain/overfill monitor is responsive to the output control and, when the first signal is received therefrom, delivers a permit signal to enable transfer of fuel to or from the transport tank. Output of the permit signal ceases in response to either the second signal or the third signal, thereby precluding delivery of fuel whenever either a predetermined high or low pressure condition is present.

40 Claims, 10 Drawing Sheets

U.S. PATENT DOCUMENTS

| | | |
|---|---|---|
| 5,117,678 A | 6/1992 | Lagergren |
| 5,460,210 A | 10/1995 | Koeninger |
| 5,966,311 A * | 10/1999 | Stemporzewski et al. ... 340/616 |
| 6,079,266 A | 6/2000 | Wright |
| 6,244,288 B1 | 6/2001 | Pettesch |

* cited by examiner

RETAIN OVERFILL MONITOR WITH INTEGRATED OVER-VACUUM AND OVER-PRESSURE DETECTION

CROSS REFERENCE TO RELATED APPLICATION

This application claims the benefit of a prior filed, co-pending application Ser. No. 60/423,020, filed Nov. 1, 2002, entitled RETAIN OVERFILL MONITOR WITH INTEGRATED OVER-VACUUM AND OVER-PRESSURE DETECTION.

BACKGROUND OF THE INVENTION

The present invention relates to improvements in control systems for filling tanks with liquids and, while not necessarily so limited, relates to filling tank trucks employed in the transport of petroleum products. Loading of petroleum products into the tanks of transport trucks involves several aspects, which are not necessarily found in other tank loading operations. First, the tank is usually divided into a plurality of separate compartments. By industry standards, provision is made for loading tanks having up to six compartments, though four and five compartment tanks are most commonly employed.

In the usual course of loading a tank truck, it is driven to a loading station, or loading rack, where a hose connection is made between each of the compartments being loaded and a bulk storage tank. The loading rack operator then presets a metering device for the delivery of a specified amount of a particular type of product into that tank compartment. The remaining compartments of the tank are also loaded in similar fashion with the same, or different types of petroleum products in predetermined amounts, as desired.

In such loading operations, the primary concern is to avoid overfilling of a tank compartment and the resulting hazard of spilled petroleum products (herein referred to as fuels for the sake of brevity), as well as the environmental damage that can result from a spill. A related concern is the building of excessive vapor pressure in the tank compartment as it fills, which may cause damage to tank seals or other equipment. Additionally, when the tank compartment is being unloaded, there can also be the danger of creating an excessive vacuum in the tank compartment as the gaseous head above the fuel increases in volume.

The overfill hazard has long been recognized and many systems have been proposed and employed to prevent overfills. Typically, various forms of sensors have been provided to detect the rise of fuel to a given upper level in a tank compartment. These sensors provide an enabling or "permit" signal to the rack mounted, control system components. The permit signal is a required input for the loading of fuel. When the fuel level in a compartment exceeds the preset, upper limit at the location of the sensor, the sensor becomes wet, the permit signal is terminated, and the loading rack control system shuts off the flow of fuel to the tank compartment. One such overfill prevention system is disclosed in U.S. Pat. No. 5,515,890.

Additionally, sensors have been used to detect if a fuel compartment has been essentially drained, so that the compartment can accept a preset quantity of fuel corresponding to its rated capacity. Such sensors provide a "retain" signal if the compartment is not fully drained prior to being loaded. The "permit" signal has also been made dependent on the existence of retain signals so that a loading operation cannot be commenced unless all compartments are empty. Indicia lights have been provided to identify a compartment that has not been fully drained.

As a further safeguard, pressure switches have been used in the vapor return piping of a tank truck to sense pressure or vacuum formation in the tank compartments. As fuel is pumped into a compartment at the terminal, fuel vapors are displaced inside the compartment. These vapors are normally routed back to the fuel terminal, via the vapor recovery line. If the recovery line malfunctions, however, the buildup of pressure can cause damage to the compartment and tank trailer. An over-pressure condition when loading will then cause a shutdown of the terminal pumps. The pressure switch requires special installation and wiring in addition to that associated with conventional overfill sensors. In a similar manner, when dumping fuel at a customer site, an excessive buildup of vacuum can also cause damage. Typically, a single pressure switch is positioned in the vapor return piping, which is a common conduit shared among the several tank compartments in the tank truck, and connected to an auxiliary input of an on-board monitor.

SUMMARY OF THE INVENTION

The present invention comprises a retain/overfill and pressure/vacuum monitoring system for use in transport tankers and similar fuel loading applications. The monitoring system includes a probe for each compartment for detecting liquid overfill conditions as well as over-pressure and over-vacuum, and a retain/overfill monitor (ROM) for monitoring the probe output, displaying the system status, and providing output control signals to the loading rack control system. The overfill pressure vacuum (OPV) probe includes a probe housing, a liquid level sensor, a pressure sensor, a microprocessor and related circuitry for monitoring outputs of the sensors and for producing an output signal to the ROM. The ROM includes one or more microprocessors and related circuitry for input, output and control processing, and a display panel with system indicators.

When all tank compartments are not full, the probe outputs a normal signal, which is received and interpreted by the ROM. The ROM outputs a permit signal to the loading rack monitor system to allow transfer of fuel to the tank. When the tank level exceeds a predetermined level, the probe microprocessor interprets the output of the fluid level sensor and outputs no signal to the ROM, which in turn removes the permit signal, and the flow of fuel to the tank is stopped. Similarly, if the pressure sensor outputs a pressure signal to the probe microprocessor, a pressure signal is output from the probe to the ROM and the ROM disables the permit signal, stopping fuel delivery. When the tank is being emptied, if the pressure sensor outputs a vacuum signal indicating that there is a vacuum condition in the tank, the probe outputs a vacuum signal to the ROM, which disables the permit signal and also provides an output that can be used to close the drain valve or sound an alarm. Additionally, the ROM provides channel-to-channel dynamic short circuit detection. If two or more probes are shorted together, all of the shorted probes may indicate a dry condition when one of the probes is wet which could result in a tank being overfilled and fuel spilled. The dynamic channel-to-channel short circuit detection monitors transitions that occur simultaneously. If a short is detected, no waveform is output by the OPV probe.

DETAILED DESCRIPTION

Figure 1:
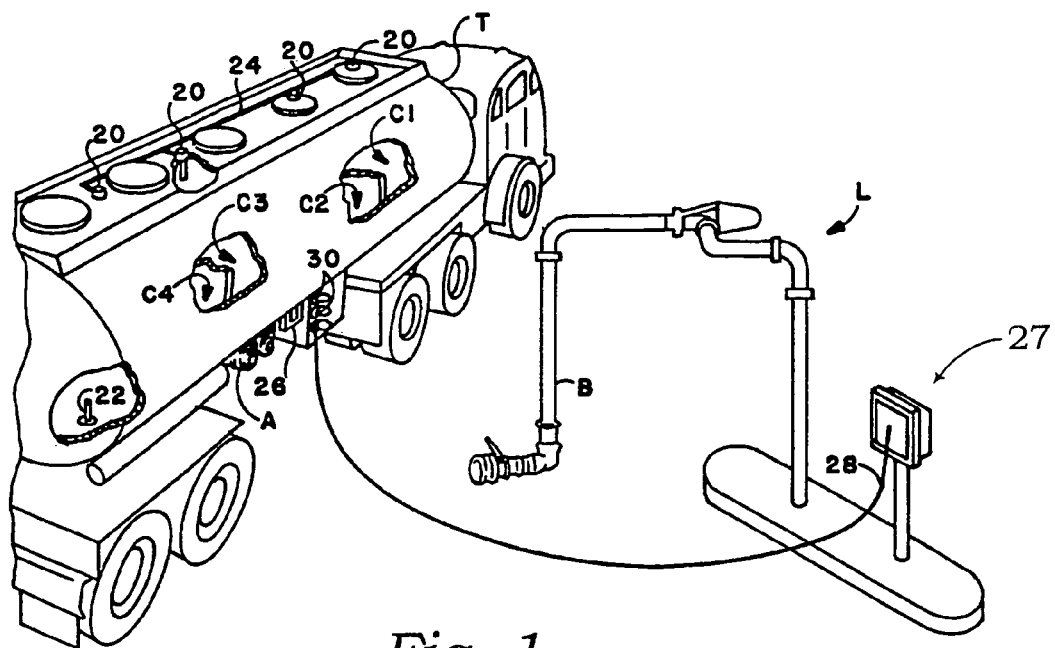
FIG. 1 is a perspective view illustrating a tank truck positioned at a loading rack, for loading of fuel with the present control system.

FIG. 1 illustrates a typical tractor/trailer unit employed in the transport of fuel. The trailer comprises a tank T which is separated into four compartments designated as C1, C2, C3 and C4. It should be understood that there is no theoretical limit to the number of compartments insofar as the present invention is concerned. It is an industry standard to make provision for loading tank trailers with up to six compartments in the United States and, as will later appear, such provision is found in the control system herein described. In Europe, some parts of Canada, and other countries, eight or even twelve compartments may be used. Tanks with less than six compartments may also be employed for the transport of fuel, with four and five compartment tanks being the most common. Accordingly, operation of the present system is not dependent upon the number of tank compartments.

In loading fuel into the tank compartments, the tractor/trailer unit is positioned adjacent a loading rack L which comprises one or more loading booms B. Each tank compartment has an adapter A to which a boom B can be connected for the discharge of fuel into the compartment. After such connection has been made, an operator sets a meter, which then controls the discharge of a predetermined amount of fuel into the tank compartment. These and other means for loading fuel into a tank compartment are well known in the art and need not be described further herein.

Assuming that the tank compartment is empty and/or that the meter has not been set to deliver more fuel than the empty volume of the compartment, the control system of the present invention does not respond. After the predetermined amount of fuel has been loaded into the compartment, the boom is disconnected and the loading operation completed.

The control system becomes active and prevents an overfill when it is attempted to load a greater volume of fuel into a compartment than its empty volume. It further prevents fuel from being loaded if any compartment has retained fuel, i.e., the compartment has not been completely unloaded before initiating a loading operation. Such intervention may be selectively overridden, for purposes discussed below. Additionally, the control system detects overpressure and vacuum conditions to prevent damage to the tanks.

To attain these ends, a top, overfill pressure vacuum (OPV) probe 20 is mounted in the upper end of each of the compartments C. A bottom, retain sensor 22 is mounted in the bottom of each compartment C. Wiring cables 24 connect the top probes 20 to a monitor 26, which is mounted on the trailer adjacent the adapters A. The bottom sensors 22 are likewise connected to the ROM 26 by wiring cables, which are hidden from view in FIG. 1.

Figure 2:
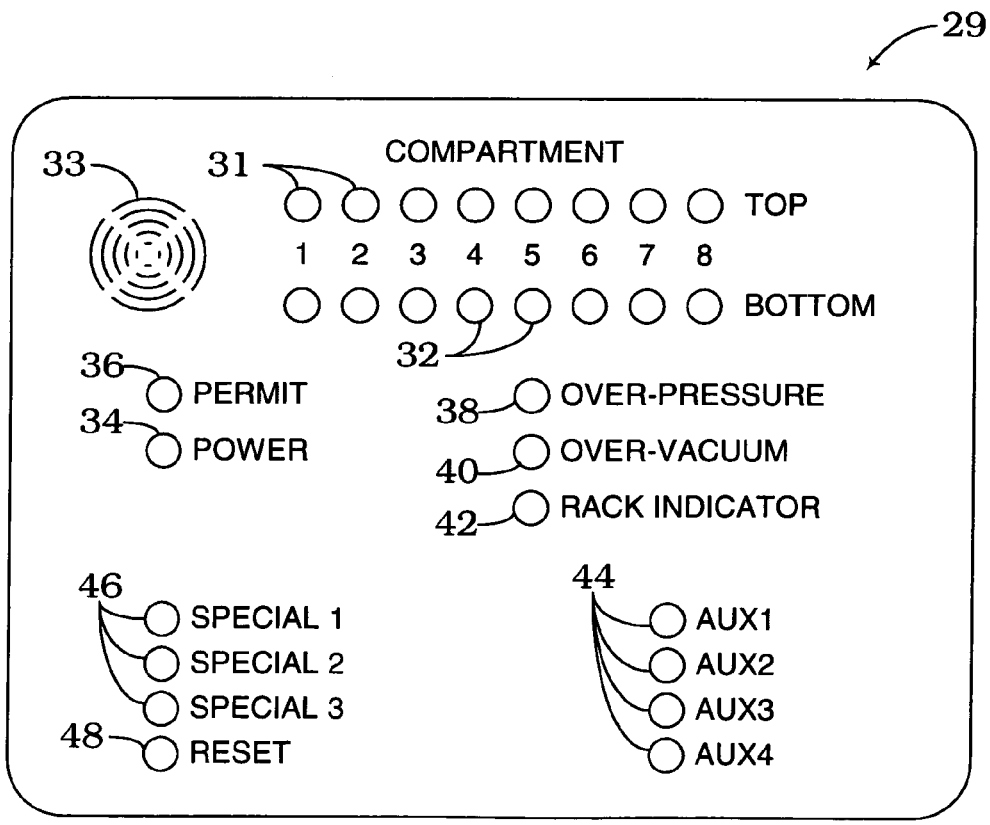
FIG. 2 is an elevation of the control system indicator panel.

The probes provide signal inputs to the monitor. The function of the monitor is to generate an output signal, referred to as a "permit signal," when all of the compartments are empty, i.e., the level of any retained fuel is beneath the bottom sensors 22. This monitor also deenergizes the permit signal when the level of fuel, in any compartment, reaches an OPV probe 20 or an unacceptable pressure condition is present in any compartment. Additionally, the monitor may control an audible 33 (see FIGS. 2 and 6) or visual alarm or control an internal valve through which product is being unloaded from a tank compartment during a vacuum condition.

Figure 9A:
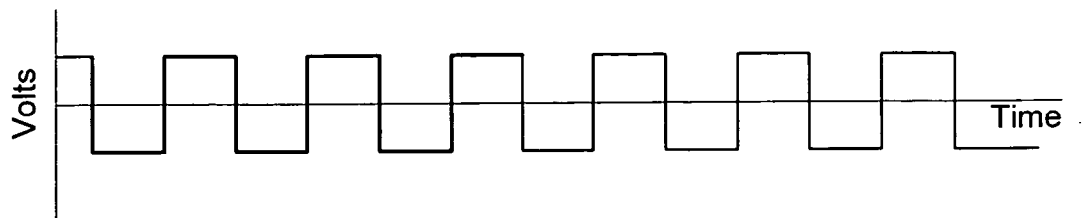
FIGS. 9a–9c are waveform diagrams for the tank probe output signals.

The permit signal (such as illustrated in FIG. 9a) is transmitted by a cable 28 to rack mounted components of the control system. The rack mounted components are responsive to and require the permit signal in order to deliver fuel. In other words, loading of fuel can only be commenced when a permit signal is sensed by the rack mounted components and will be automatically terminated when that signal is interrupted. There are currently at least two forms of permit signals to which the rack mounted components are responsive. The circuitry within the ROM 26 generates these forms of signals. The cable 28 may be selectively connected to the appropriate receptacle 30 to which the signals are fed, dependent on the design of the rack mounted components.

In addition to controlling the loading of fuel in the manner described, the ROM 26 is provided with an indicator panel 29 (FIG. 2) for indicating the status of the system. A series of LEDs or other lights 31 are mounted on the panel 29 to indicate the overfill status of the top sensors of each compartment. Similarly, a series of LEDs or other lights 32 is provided to indicate the retain status of the bottom sensors. When an OPV probe 20 is actuated, the corresponding light, for the compartment in which that sensor is located, is illuminated. If there is retained fuel, which has actuated a bottom sensor 22, the corresponding light, for the compartment in which that sensor is located, is illuminated. The LEDs may include dual-color LEDs to indicate a normal status such as green to indicate that the probe is working, red to indicate a wet probe or pressure/vacuum problem, flashing red to indicate an open wire or probe, or short, and no output to indicate that a compartment has not been configured.

Also provided on the panel 29 is a power LED 34; which indicates that the truck mounted components of the control system are energized. LED 36 is mounted on the monitor indicator panel 29 to indicate that all inputs (sensors, AUX) have been satisfied and a permit signal is being generated. LEDs 38 and 40 indicate over-pressure or over-vacuum conditions respectively. A rack indicator LED 42 is provided to indicate that the ROM system 26 is connected and communicating with the rack monitor 27 via cable 28. AUX 1–4 indicators 44 are active when a low voltage is received on one of the aux inputs. Special 1–3 LEDS 46 are active when either the configurable input or output is active. LED 48 indicates that the ROM 26 is in one of the reset modes such as retain override or pressure override, for example.

Figure 3:
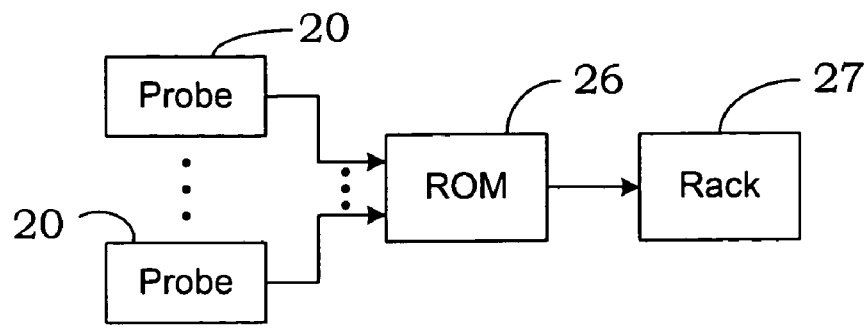
FIG. 3 is a functional block diagram of the control system.
Figure 4:
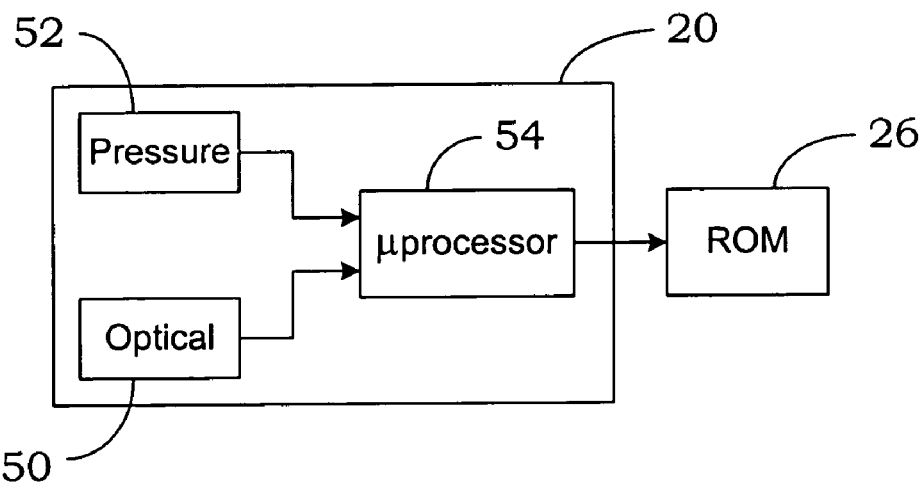
FIG. 4 is a functional block diagram of the tank probe.
Figure 5:
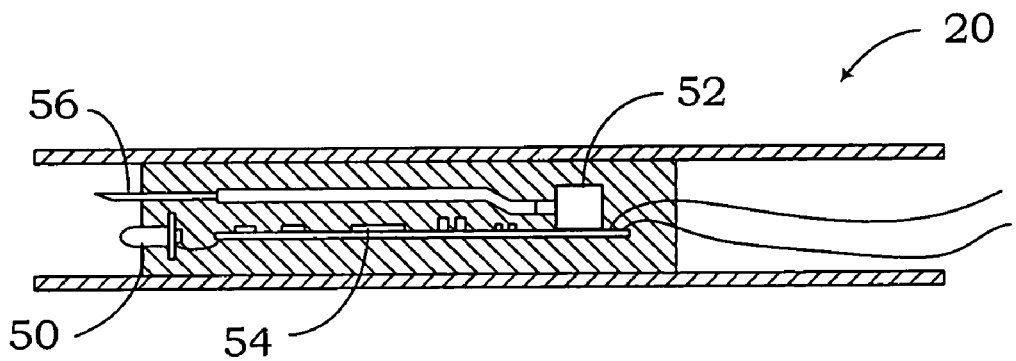
FIG. 5 is a diagrammatic longitudinal cross-sectional view of the OPV probe.

Referring to FIGS. 3–5, the control system comprises one or more OPV probes 20 connected to the ROM system 26, which is connected to the loading rack system 27 via cable 28. The OPV probes include an optical sensor 50, which is of a known type based on the use of a light emitting diode and a light responsive diode, a pressure sensor 52 and a microprocessor control circuit 54. In the preferred embodiment, microprocessor 54 may be an Atmel ATtiny15 8-bit microcontroller with 1K bytes of flash memory.

In the optical sensor's dry condition, light is reflected by a prism (not shown) to energize the light responsive diode and generate a signal to the probe microprocessor 54, which indicates that the fuel level has not reached the optical sensor. When the prism is wetted, the light beam is deflected so that the light responsive diode is no longer energized. The lack of a signal output from the optical sensor 50 to the microprocessor 54 indicates that fuel has reached the level of the sensor, and that an overfill condition is imminent. In response, microprocessor 54 terminates transmission of the permit waveform to the ROM system 26.

Figure 9B:
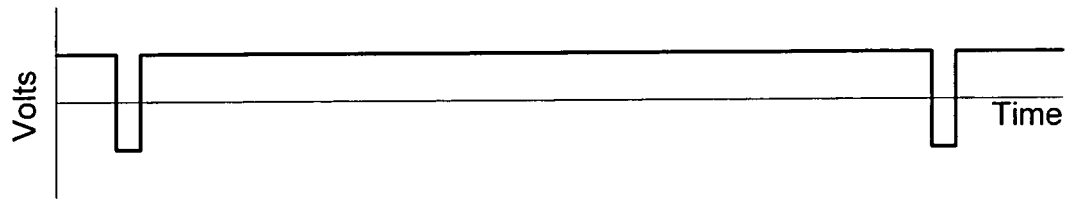
Figure 9C:
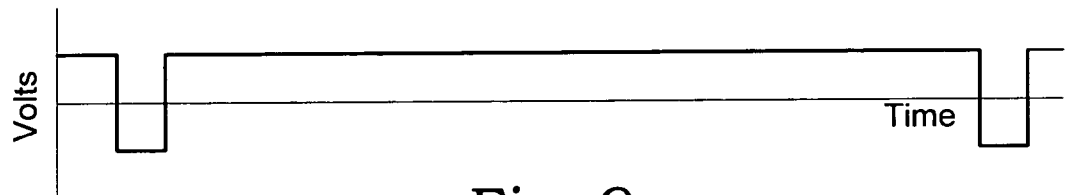

The pressure sensor 52 includes a pressure transducer, such as a Honeywell 24PCBFA6G transducer, which communicates with the exterior of the OPV probe by way of a tube 56. Normally, there is no output from the pressure sensor. However, in an over-pressure condition of approximately 3–4 psi or more above normal pressure, the pressure transducer will generate an over-pressure signal to the microprocessor 54. In response, microprocessor 54 generates a pressure waveform (such as illustrated in FIG. 9b), which is output to the ROM system 26. In an over-vacuum condition of more than approximately 1 psi below normal pressure, the pressure transducer will generate a vacuum signal to the microprocessor 54. In response, the microprocessor 54 will output a vacuum waveform (such as illustrated in FIG. 9c) to the ROM system. It should be understood that more than one waveform may be output by the microprocessor 54 to indicate different pressure conditions or vacuum conditions. By using more than one pressure and one vacuum waveform output, the ROM system may provide additional information to the operator to determine the cause of the problem.

Figure 6:
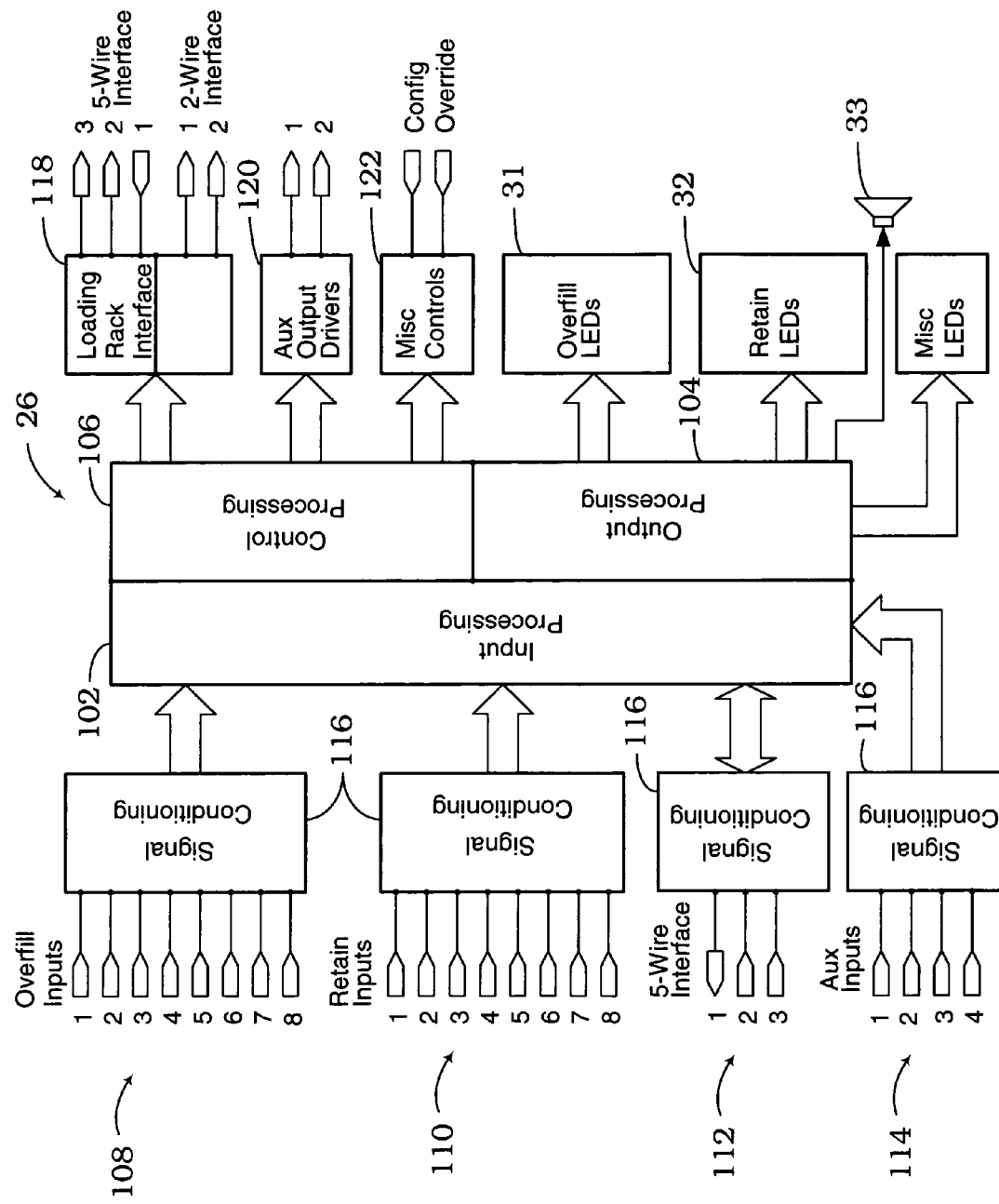
FIG. 6 is a functional block diagram of the retain/overfill monitor.

Referring to FIG. 6, a functional block diagram of the ROM system is generally indicated by reference numeral 26. ROM system 26 is a microprocessor controlled system utilizing one or more microprocessors to interpret inputs from various probes and control the output of the permit signal to the loading rack system. Additionally, ROM system 26 provides status indicators and other outputs which may be used to control audible alarms 33 and other systems. In the preferred embodiment, the microprocessor may include one or more Atmel ATtiny26 8-bit microcontrollers with 2K bytes of flash memory.

ROM system 26 may include input processing 102, output processing 104 and control processing 106. The input processing 102 receives conditioned input from OPV probes 108, retain probes 110, other probes 112 and auxiliary inputs 114 from brake interlocks, other pressure sensors, etc., for example. Input signal conditioning 116 is provided by a resistive voltage divider network to control the input voltage levels. The input processing 102 takes the probe inputs, and converts them into flags indicating the type and state of each input. At this point the channel-to-channel dynamic short detection is provided and short conditions are also stored as state information. The input processing 102 sets status flags which are read by control processing to decide what should be done by the various outputs and displays, and stores the results of these decisions. The output processing 104 reads this decision data to execute the required output conditions to control the LEDs, output of the permit signal to the loading rack interface 118, auxiliary output drivers 120, and to override miscellaneous controls 122 such as filling a partially filled tank, for example.

Figure 7:
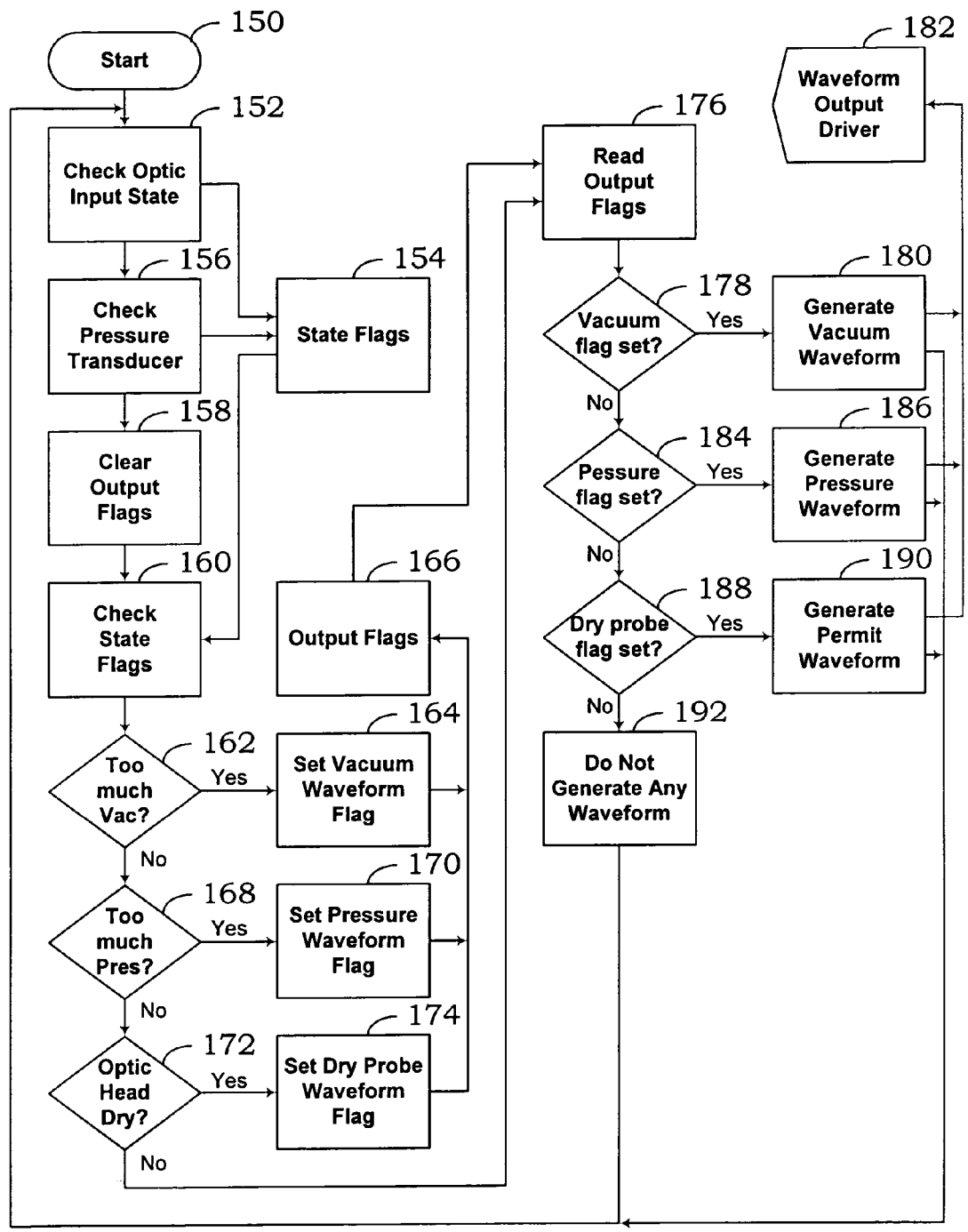
FIG. 7 is a software flow diagram for the OPV probe control.

Referring to FIG. 7, the software flow chart for the OPV probe microprocessor is shown. It should be understood that the software flow charts illustrate the operation of the OPV probe microprocessor, but are not intended to be construed as a literal translation of the code for the OPV probe. As with many microprocessor based systems, execution of some routines is interrupt driven, other routines are executed based on a time slice, others may be sequentially processed, while still other routines are concurrently processed. Additionally, the source code language may influence the processing structure. The software flow charts provide one means to disclose the software control of the OPV probe and are not intended to be limited to the form presented.

When power is applied to the OPV probe, the microprocessor loads and begins executing the software as indicated by block 150. The OPV probe microprocessor first checks the input state of the optical sensor head, block 152. If a signal is received from the optical sensor head, the optic head state flag is set, otherwise it is cleared, block 154. Next, the state of the pressure transducer is checked, block 156 to determine if a pressure or vacuum condition is detected. If a pressure condition is detected, the pressure state flag is set, block 154. If a vacuum condition is detected, the vacuum state flag is set, block 154. If neither a pressure or vacuum condition is present, both state flags are cleared, block 154.

Next, all output flags are cleared, block 158, and all state flags are read, block 160. If the vacuum state flag was set, decision block 162, the vacuum waveform flag is set, block 164 and saved in the output flags table, block 166. If the vacuum state flag was not set, processing continues to decision block 168. If the pressure state flag was set, decision block 168, the pressure waveform flag is set, block 170, and saved in the output flags table, block 166. If the pressure state flag was not set, processing continues to decision block 172 where the optic head state flag is read. If the optic head state flag is set, the dry probe waveform flag is set, block 174, and saved in the output flags table, block 166.

Processing continues by reading the output flags, block 176. If the vacuum waveform flag is set, decision block 178, the OPV microprocessor generates the vacuum waveform, block 180, and outputs the waveform, block 182, to the ROM system. If the vacuum waveform flag is not set, the pressure waveform flag is checked. If the pressure waveform flag is set, decision block 184, the pressure waveform is generated, block 186, and output, block 182, to the ROM system. If the pressure waveform flag is not set, the OPV microprocessor checks the status of the optic head waveform flag. If the optic head waveform flag is set, indicating that the tank is not full, decision block 188, the normal or permit waveform is generated by the microprocessor, block 190, and the waveform output, block 182. If no flags are set, block 192, no waveforms are output. After either generation of one of the above waveforms or generating no waveform, processing returns to the beginning of the loop and repeats.

In FIGS. 8a–8i the software flow charts for the ROM system are shown. It should be understood that the software flow charts illustrate the operation of the ROM system microprocessors, but are not intended to be construed as a literal translation of the code for the ROM system. As with many microprocessor based systems, execution of some routines may be interrupt driven, other routines may be executed based on a time slice, others may be sequentially run, while still other routines may be concurrently processed. Additionally, the source code language may influence the processing structure. The software flow charts provide one means to disclose and describe the software control of the ROM system and are not intended to be limited to the form presented.

Figures 8A, 8B, 8I:
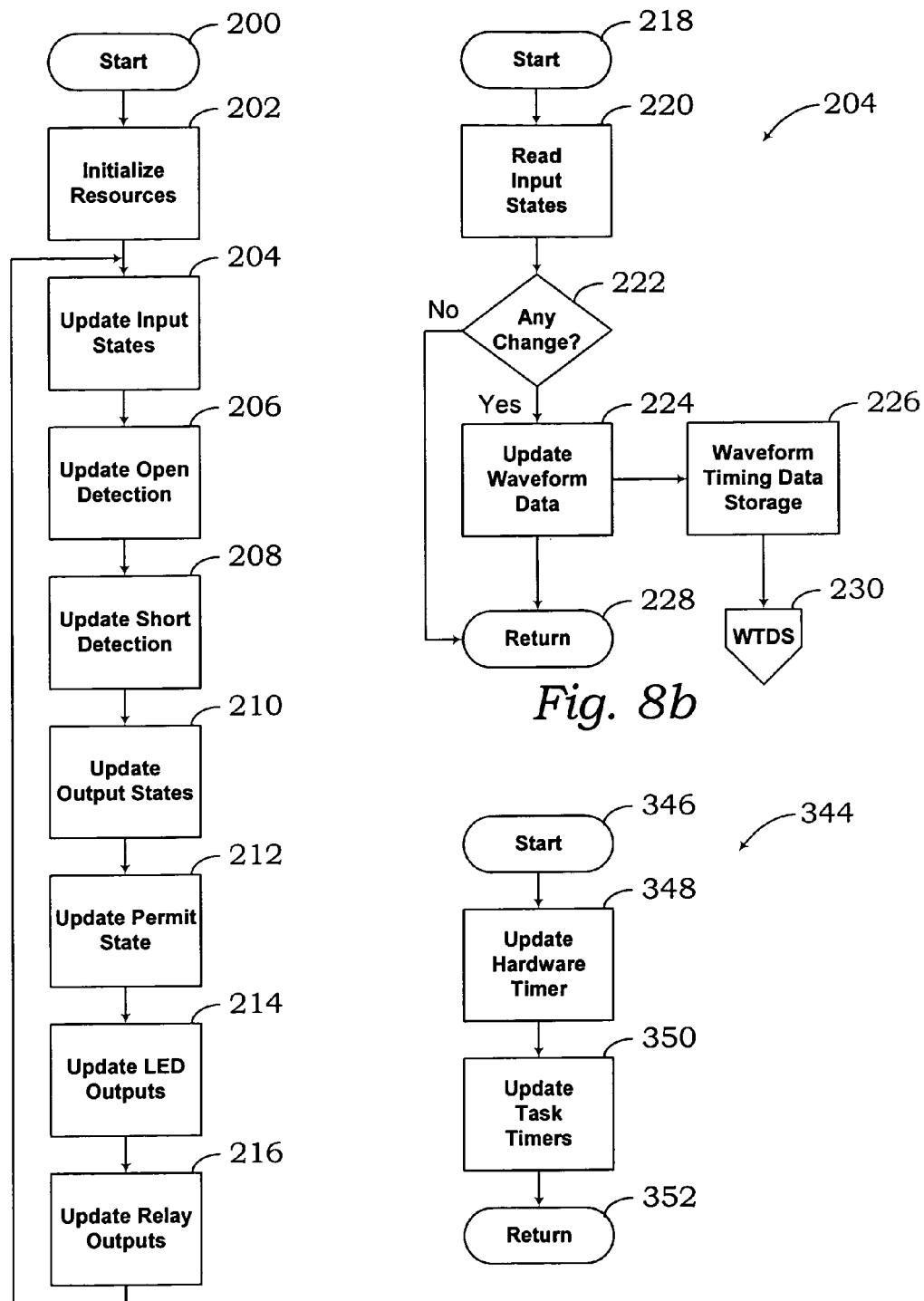
FIGS. 8a–8i are software flow diagrams for the retain overfill monitor control.

Referring initially to FIG. 8a, the ROM Main routine is illustrated beginning with the start block 200. All the system's resources, such as flags and memory for example, are initialized, block 202. Next, seven subroutines are called as shown in FIG. 8a. The order in which the subroutines are called is not important because each subroutine is essentially independent and processes input data based on flags set in other processes.

Referring to FIGS. 8a and 8b, the Update Input States routine is called, block 204. The Update Input States routine starts, block 218, by resetting the system state flags and reading the input states, block 220, of all inputs to the input processing block 102 (FIG. 6). If any change is detected, decision block 222, the waveform data is updated, block 224, saved in the waveform timing data storage, block 226, and the routine ends and returns, block 228, to the ROM Main routine. If there is no change detected, decision block 222, the routine ends and returns, block 228.

Figures 8C, 8D:
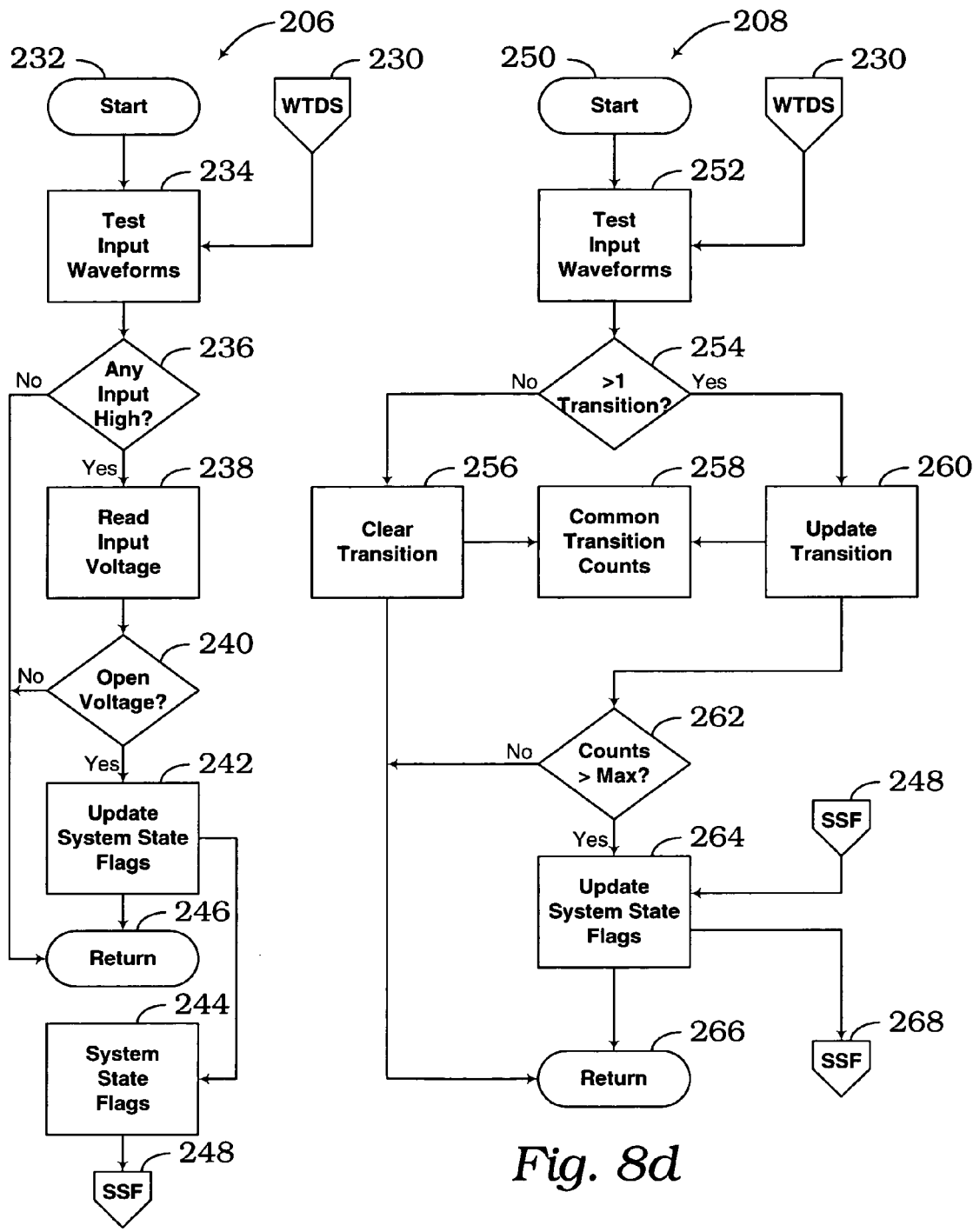

Next, referring to FIGS. 8a and 8c, the Update Open Detection routine is called, block 206, and starts, block 232, by testing the input waveforms, block 234, by determining if the input is oscillating. If the input is stable, the input voltage is converted from analog to digital. The input waveforms are read from the waveform timing data storage (FIG. 8b, block 226), as indicated by the continuation block 230. If any input is a logic high, decision block 236, the input voltage is read, block 238. If the voltage is the same as the input source voltage indicating an open condition, decision block 240, the system state flags are updated, block 242, and saved in the system state flags table, block 244. An open condition may occur when the probe is wet, no probe is present or when the probe fails. The routine then returns to the ROM Main routine, block 246. If no input is high, decision block 236, the routine returns to the ROM Main routine, block 246.

Referring to FIGS. 8a and 8d, the Update Short Detection routine is called, block 208, and starts, block 250, by testing the input waveforms from waveform testing data storage, block 230, for transitions from a high logic level to a low logic level, or from a low logic level to a high logic level, block 252. The input waveforms are read from the waveform timing data storage (FIG. 8b, block 226), as indicated by continuation block 230. The system compares a transition of one probe with the input of all other probes to determine if any other transition occurred at the same time, which could indicate a short. If more than one transition is detected, decision block 254, the transmission count is updated, block 260, and stored in the common transition counts table, block 258. If the counts exceed a predetermined maximum indicating that a short between probes has been detected, decision block 262, the system state flags are read from the system state flags table (FIG. 8c, block 244), as indicated by continuation block 248, and the system state flags are updated to include the short status, block 264. The routine then returns to the ROM Main routine, block 266. If the number of transitions is not greater than one, decision block 254, the transition count is cleared, block 256, and stored in the common transition counts table, block 258. The routine then exits, block 266.

Figure 8E:
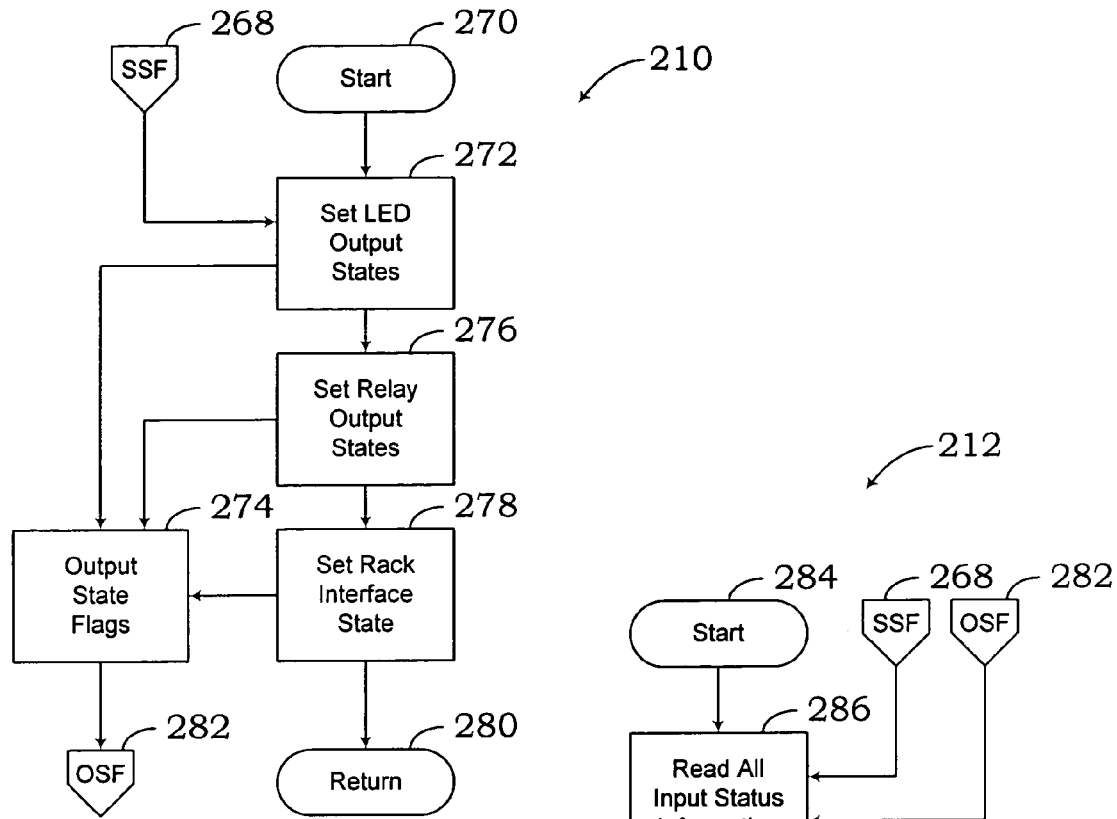

Referring to FIGS. 8a and 8e, the Update Output States routine is called, block 210, and starts, block 270, by setting the LED output states, block 272, according to the system state flags from the system state flags table as indicated by continuation block 268. The relay output states, block 276, and the rack interface state, block 278, are set according to the system state flags, continuation block 268. Each of these steps updates the output state flags table, block 274. The routine then returns to the ROM Main routine, block 280.

Figure 8F:
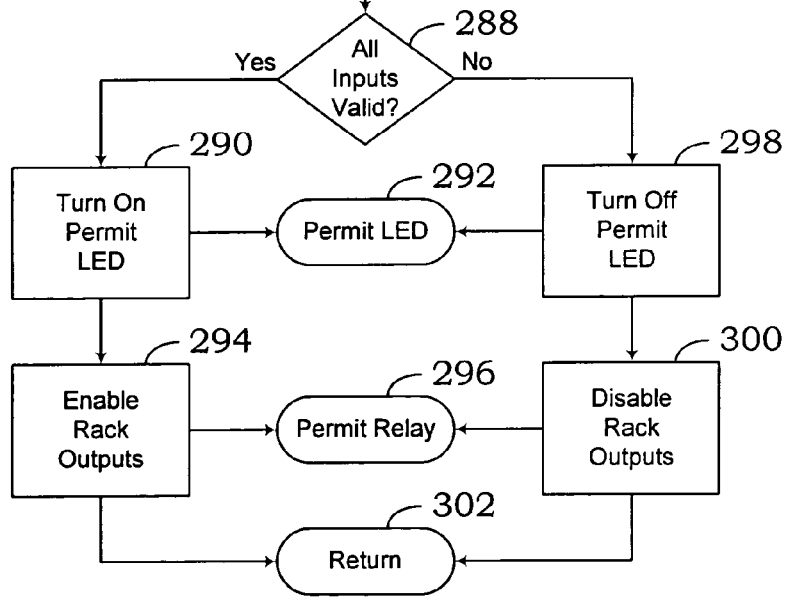

Referring to FIGS. 8a and 8f, the Update Permit State routine is called, block 212, which starts, block 284, by reading all input status information, block 286, from the system states flag table as indicated by continuation block 268, and the output state flags table (FIG. 8e, block 274), as indicated by continuation block 282. If all inputs are valid, decision block 288, which indicates that the probe is dry and present, and there is no over-pressure or over-vacuum condition, the permit LED is turned on, block 290, and illuminated, block 292. Next, the rack outputs are enabled, block 294, and the permit relay is energized, block 296. If all inputs are not valid, decision block 288, the permit LED is turned off, blocks 298 and 292, the rack outputs are disabled, block 300, and the permit relay is deenergized, block 296. The routine then returns to the ROM Main routine as indicated by block 302.

Figure 8G:
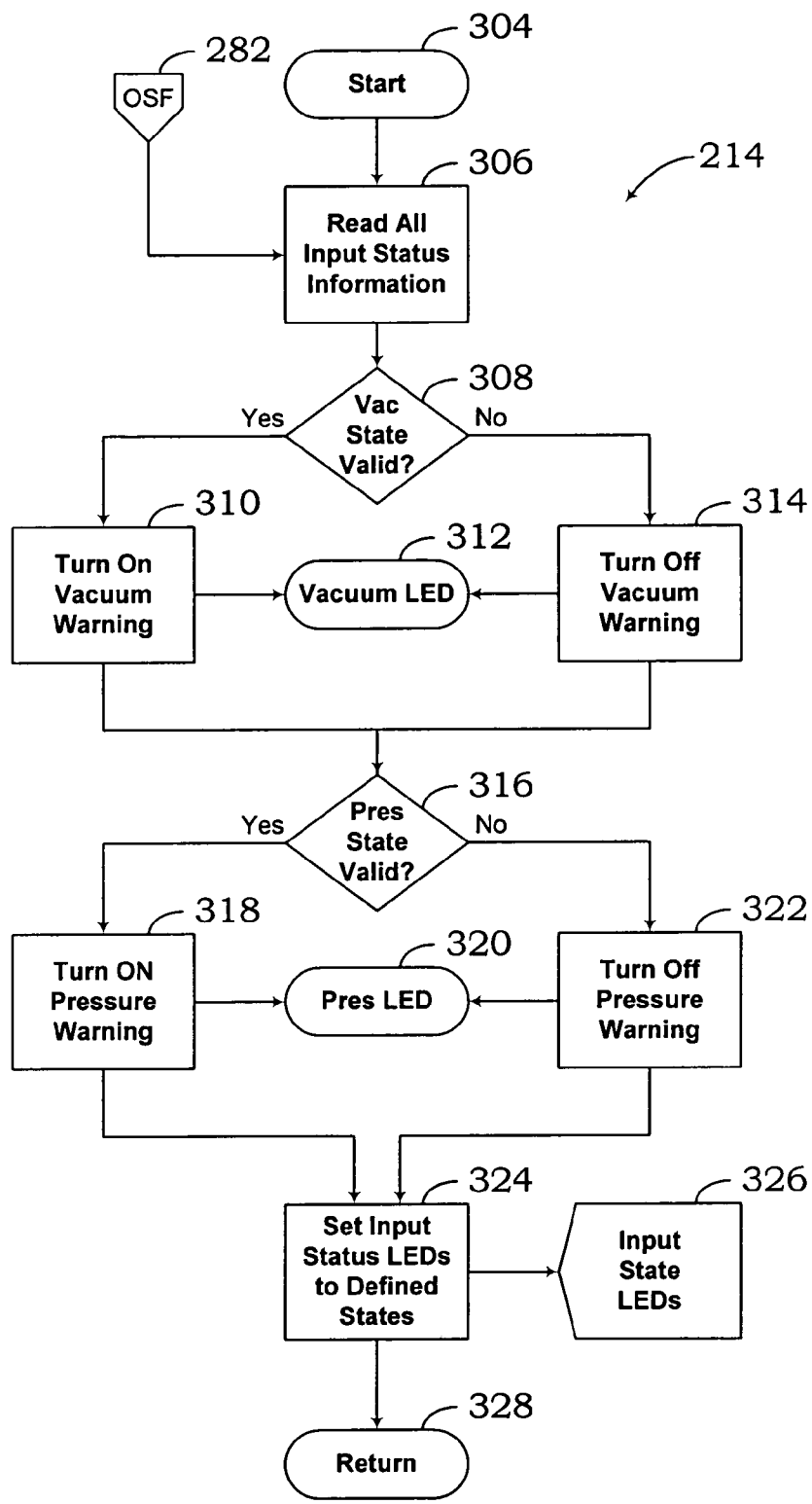

Referring to FIGS. 8a and 8g, the Update LED Outputs routine is called, block 214, which starts, block 304, by reading the input status information, block 306, from the output state flag table as indicated by continuation block 282. If an over-vacuum state is detected, decision block 308, the vacuum warning is turned on, block 310, and the vacuum LED is turned on, block 312. If no vacuum is detected, decision block 308, the vacuum warning is turned off, block 314, and the vacuum LED is extinguished, block 312. Next, the pressure state is checked, decision block 316. If an over-pressure state is detected, the pressure warning is turned on, block 318, and the pressure LED is illuminated, block 320. If no pressure state is detected, the pressure warning is turned off, block 322, and the pressure LED is turned off, block 320. Next the status of the input LEDs are set to the defined states, block 324, and the LEDs illuminated or extinguished based on these states, block 326. The routine then returns to the ROM Main routine as indicated by return block 328.

Figure 8H:
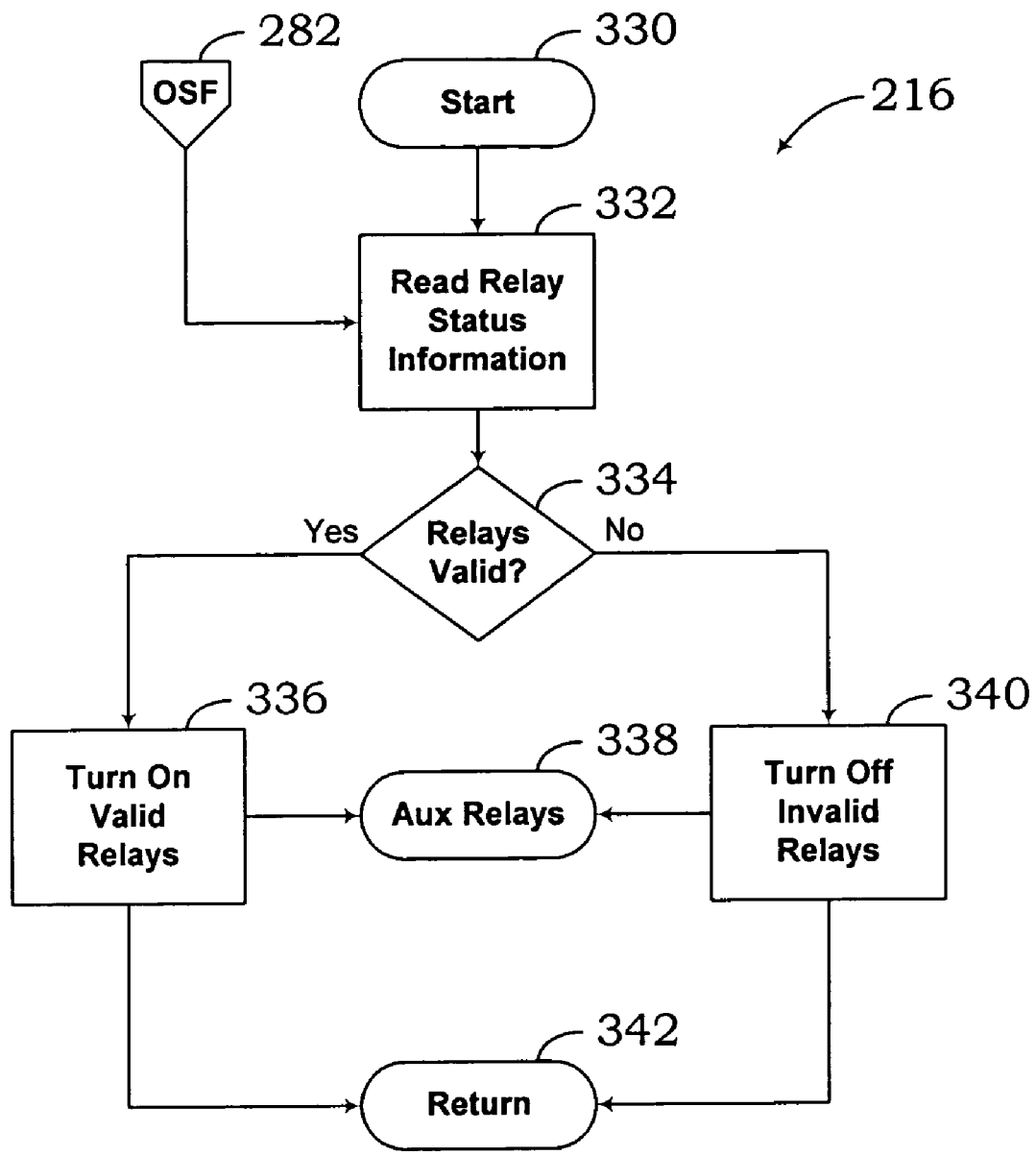

Referring to FIGS. 8a and 8h, the Update Relay Outputs routine is called, block 216. The Update Relay Output routine starts, block 330, by reading the relay status information, block 332, from the output state flags table as indicated by continuation block 282. If the status of the relays is valid, decision block 334, the auxiliary relays are turned on, block 336, and energized, block 338. If the status of the relays is not valid, the relays are turned off, block 340, and deenergized, block 338. The routine then returns to the ROM Main routine as indicated by return block 342.

Referring to FIG. 8i, the Timer Interrupt routine is shown generally indicated by reference numeral 344. The Timer Interrupt routine runs periodically based on the system clock. This routine starts, block 346, by updating the system hardware timers, block 348, and the task timers, block 350. The routine then exits, block 352.

Referring to FIGS. 9a–9c, representative waveform diagrams for the OPV probe waveform output are shown. The waveform in FIG. 9a illustrates a normal condition where the probe is dry and present with no over-pressure or over-vacuum state. The normal permit waveform output is an approximate square-wave with a period of approximately six to thirty-five milliseconds. The frequency of the normal waveform output is not important. However, the normal waveform output to indicate a permit condition is a standard industry signal for these types of probes. When the ROM system receives a normal waveform, the ROM system outputs a permit signal to the rack interface.

FIG. 9b illustrates an over-pressure waveform produced by the OPV probe microprocessor. When an over-pressure condition is detected, the microprocessor outputs a short low voltage signal followed by a long high voltage signal. The duration of the low voltage pulse may be approximate 1.2 milliseconds and the period of the high voltage pulse may be approximately 150 milliseconds. The duration of each of the pulses may be selected to adequately distinguish the over-pressure waveform from the other waveforms at a certain operating frequency of the system. When the ROM system receives the over-pressure waveform, the ROM system activates the over-pressure warning LED and disables the permit signal to the rack interface.

FIG. 9c illustrates an over-vacuum waveform generated by the probe microprocessor in response to receiving an over-vacuum signal from the pressure transducer. When an over-vacuum condition is detected, the microprocessor outputs a short low voltage signal followed by a long high voltage signal. The duration of the low voltage signal may be approximately 2.2 milliseconds followed by a 150-millisecond high voltage signal, for example. As with all of the signals, the particular signal shown in FIGS. 9a–9c is illustrative and not important as long as the various signals may be adequately distinguished.

Figure 10:
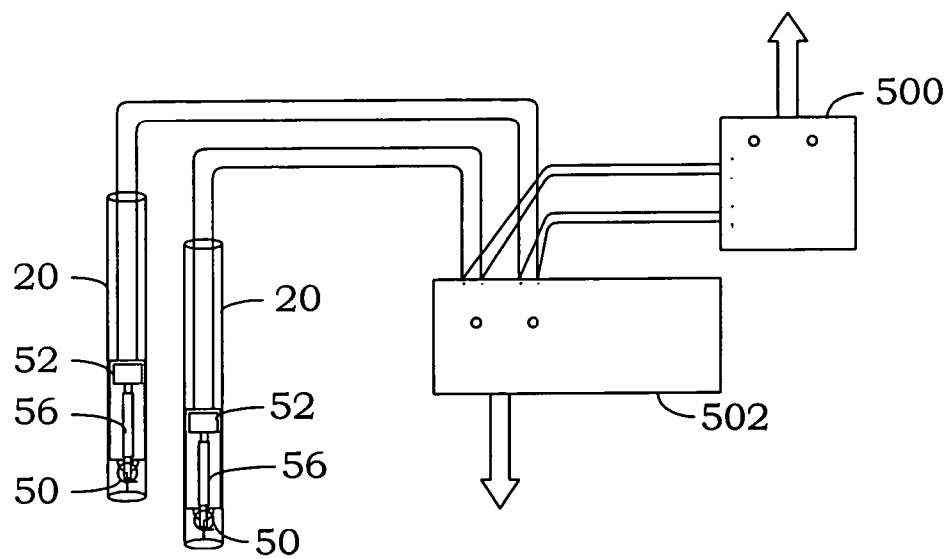
FIG. 10 is a functional block diagram of the add-on detector.

Referring to FIG. 10, an add-on system is generally indicated by reference numeral 500. OPV probe 20 may directly replace a standard overfill probe with no modification to the tank or system. However, the probes that the OPV probe 20 replace only output a permit waveform or no waveform. Thus, a prior art on-board monitor 502 will only detect a permit signal or no signal from OPV probe 20. If excessive pressure or vacuum is detected, the OPV probe 20 outputs an over-pressure or over-vacuum waveform instead of a dry waveform, or no waveform. Since these very low frequency waveforms are not detected by existing on-board monitors 502 or terminal racks, they are treated the same as if no waveform was generated. This will cause the pumps to shut down at a loading terminal. Thus, the OPV probe 20 may be used with legacy systems that do not support the over-pressure and/or over-vacuum signals from the probe.

In order to take advantage of the advanced features of the OPV probe 20 without having to replace the on-board monitor 502, the add-on detector 500 may be used. Add-on detector 500 is a subset of the above-described ROM system, which connects directly to the probe inputs as shown in FIG. 10. Add-on detector 500 may have two or more inputs to monitor two or more probes.

Add-on detector 500 includes one or more microprocessors which interpret the input signals as described above for the ROM system to detect over-pressure, over-vacuum conditions and control the LEDs and relay output functions as shown in FIGS. 8a–8i excluding processing related to the permit state processing and other steps not related to detecting over-pressure and over-vacuum conditions. Accordingly, the add-on detector 500, in concert with the on-board monitoring system 502 and probes 20, provide a complete monitoring system.

Having thus described the invention, what is claimed as new and desired to be secured by Letters Patent is:

1. A system for monitoring the conditions within a fuel storage compartment of a transport tank, said system comprising:
   a probe adapted to be installed in a fuel storage compartment and having a first sensor for detecting the presence of fuel at a predetermined level therein, and a second sensor for detecting the pressure of a gaseous head above the fuel,
   a signal generator responsive to said first and second sensors for producing a first signal representing a normal condition when the first sensor is not detecting fuel at said predetermined level, a second signal when said second sensor detects a predetermined high pressure of the gaseous head, and a third signal when said second sensor detects a predetermined low pressure of the gaseous head, and
   an output control responsive to said signals for delivering as output said first signal when said second and third signals are not present, and for delivering as output said second signal when said second signal is received or said third signal when said third signal is received, whereby to indicate a condition precluding delivery of fuel to or from the compartment whenever either a predetermined high or low pressure condition is present.

2. The system as set forth in claim 1 wherein said first signal is a periodic waveform.

3. The system as set forth in claim 2 wherein said second signal is a periodic waveform having a period greater than said first signal.

4. The system as set forth in claim 3 wherein said third signal is a periodic waveform having a period greater than said second signal.

5. The system as set forth in claim 1 wherein said predetermined high pressure is approximately 3–4 psi above normal pressure.

6. The system as set forth in claim 1 wherein said predetermined low pressure is approximately 1 psi below normal pressure.

7. The system as set forth in claim 1 further comprising a retain/overfill monitor coupled to said output control and responsive to said signals from said output control to selectively output a permit signal to enable transfer of fuel to or from said transport tank.

8. The system as set forth in claim 7 wherein said retain/overfill monitor outputs said permit signal when said first signal is received from said output control.

9. The system as set forth in claim 8 wherein said retain/overfill monitor ceases output of said permit signal when said second signal is received from said output control.

10. The system as set forth in claim 9 wherein said retain/overfill monitor includes a display panel having indicators responsive to said first and second signals for providing an overfill and/or a high pressure detected display.

11. The system as set forth in claim 10 wherein said indicators present an audible alarm in response to said second signal.

12. The system as set forth in claim 8 wherein said retain/overfill monitor ceases output of said permit signal when said third signal is received from said output control.

13. The system as set forth in claim 12 wherein said retain/overfill monitor includes a display having an indicator responsive to said third signal for presenting a low pressure detected display.

14. The system as claimed in claim 13 wherein said indicator presents an audible alarm in response to said third signal.

15. The system as set forth in claim 7 wherein said retain/overfill monitor includes a display panel having indicators for displaying the operational status of the system.

16. The system as set forth in claim 15 wherein said indicators present a normal system display in response to said first signal in the absence of said second and third signals.

17. The system as set forth in claim 7 further comprising at least two of said probes and said signal generators and a detector responsive to a short circuit between said at least two probes to cause said retain/overfill monitor to disable output of said permit signal when said short is detected.

18. The system as set forth in claim 17 wherein said detector compares the output signals from each of said at least two signal generators for a predetermined number of simultaneous transitions which indicate a short between said at least two probes.

19. A system for monitoring the conditions within a fuel storage compartment of a transport tank, said system comprising:
  a probe adapted to be installed in a fuel storage compartment and having a first sensor for detecting the presence of fuel at a predetermined level therein, and a second sensor for detecting the pressure of a gaseous head above the fuel,
  a signal generator responsive to said first and second sensors for producing a normal waveform when the first sensor is not detecting fuel at said predetermined level, a pressure waveform when said second sensor detects a predetermined high pressure of the gaseous head, and a vacuum waveform when said second sensor detects a predetermined low pressure of the gaseous head, and
  an output control responsive to said waveforms for delivering as output said normal waveform when said pressure and vacuum waveforms are not received, and for delivering as output exclusively said pressure waveform or said vacuum waveform when either are received, whereby to indicate a condition precluding delivery of fuel to or from the compartment whenever either a high or low pressure condition is present.

20. The system as set forth in claim 19 wherein said normal waveform is periodic.

21. The system as set forth in claim 20 wherein said pressure waveform is periodic and has a period of different duration than said normal waveform.

22. The system as set forth in claim 21 wherein said vacuum waveform is periodic and has a period of different duration than said normal and pressure waveforms.

23. The system as set forth in claim 19 wherein said predetermined high pressure is approximately 3–4 psi above normal pressure.

24. The system as set forth in claim 19 wherein said predetermined low pressure is approximately 1 psi below normal pressure.

25. The system as set forth in claim 19 further comprising a retain/overfill monitor coupled to said output control and responsive to said signals from said output control to selectively output a permit signal to enable transfer of fuel to or from said transport tank.

26. The system as set forth in claim 25 wherein said retain/overfill monitor outputs said permit signal when said normal waveform is received from said output control.

27. The system as set forth in claim 26 wherein said retain/overfill monitor ceases output of said permit signal when said pressure waveform is received from said output control.

28. The system as set forth in claim 27 wherein said retain/overfill monitor includes a display panel having indicators responsive to said normal and pressure waveforms for providing an overfill and/or a high pressure detected display.

29. The system as set forth in claim 28 wherein said indicators present an audible alarm in response to said pressure waveform.

30. The system as set forth in claim 26 wherein said retain/overfill monitor ceases output of said permit signal when said vacuum waveform is received from said output control.

31. The system as set forth in claim 30 wherein said retain/overfill monitor includes a display having an indicator responsive to said vacuum waveform for presenting a low pressure detected display.

32. The system as claimed in claim 31 wherein said indicator presents an audible alarm in response to vacuum waveform.

33. The system as set forth in claim 25 wherein said retain/overfill monitor includes a display panel having indicators for displaying the operational status of the system.

34. The system as set forth in claim 33 wherein said indicators present a normal system display in response to said normal waveform in the absence of said pressure and vacuum waveforms.

35. The system as set forth in claim 25 further comprising at least two of said probes and at least two signal generators and a detector responsive to a short circuit between said at least two probes to cause said retain/overfill monitor to disable output of said permit signal when said short is detected.

36. The system as set forth in claim 35 wherein said detector compares the output signals from each of said at least two signal generators for a predetermined number of simultaneous transitions which indicate a short between said at least two probes.

37. A method of monitoring the conditions within a fuel storage compartment of a transport tank, said method comprising the steps of:
  (a) detecting the presence of fuel at a predetermined level in said compartment,
  (b) detecting the pressure of a gaseous head above the fuel in said compartment,
  (c) generating a first signal when fuel is not detected at said predetermined level,
  (d) generating a second signal when the gaseous head has a predetermined, excessively high pressure,
  (e) generating a third signal when the gaseous head has an excessively low pressure,
  (f) delivering as output said first signal when said second and third signals are not produced, and
  (g) delivering as output exclusively said second signal or said third signal when either are produced, whereby to indicate a condition precluding delivery of fuel to or from the compartment whenever excessively high or low pressure conditions are present.

38. The method as set forth in claim 37, further comprising the step of:
  (h) monitoring said output signals and providing a permit signal in response to said first signal to enable transfer of fuel to or from said transport tank.

39. The method as set forth in claim 38 wherein said step (h) includes ceasing to provide said permit signal in response to said second signal.

40. The method as set forth in claim 38 wherein said step (h) includes ceasing to provide said permit signal in response to said third signal.

* * * * *